United States Patent
Cohen

(10) Patent No.: US 12,155,314 B2
(45) Date of Patent: Nov. 26, 2024

(54) METHODS AND APPARATUS TO INCREASE AN OPERATIONAL RANGE OF A DUTY CYCLE OF A TWO-SWITCH FLYBACK CONVERTER

(71) Applicant: Texas Instruments Incorporated, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 379 days.

(21) Appl. No.: 17/574,355

(22) Filed: Jan. 12, 2022

(65) Prior Publication Data

US 2022/0224239 A1    Jul. 14, 2022

Related U.S. Application Data

(60) Provisional application No. 63/136,287, filed on Jan. 12, 2021.

(51) Int. Cl.
*H02M 3/335* (2006.01)
*H02M 1/00* (2006.01)
*H02M 1/08* (2006.01)

(52) U.S. Cl.
CPC ..... *H02M 3/33592* (2013.01); *H02M 1/0012* (2021.05); *H02M 1/08* (2013.01)

(58) Field of Classification Search
CPC .. H02M 3/33592; H02M 1/0012; H02M 1/08; H02M 3/33515
See application file for complete search history.

(56) References Cited

U.S. PATENT DOCUMENTS

| | | | |
|---|---|---|---|
| 10,348,193 B1* | 7/2019 | Cohen | G06F 1/266 |
| 10,644,607 B2* | 5/2020 | Li | H02M 3/33592 |
| 2003/0039128 A1* | 2/2003 | Cohen | H02M 3/33569 |
| | | | 363/20 |

(Continued)

OTHER PUBLICATIONS

ST Life Augmented, "170W high input voltage two switch flyback based on L6565 and 1500V K5 MOSFETs," AN5287 Application note, Jan. 2020, 30 pages.

(Continued)

*Primary Examiner* — Kyle J Moody
(74) *Attorney, Agent, or Firm* — Charles F. Koch; Frank D. Cimino

(57) ABSTRACT

An example apparatus includes: a first diode having a first diode terminal; a transformer having a transformer terminal; a second diode having a second diode terminal and a third diode terminal, the second diode terminal coupled to the transformer terminal; a first switch having a first current terminal and a second current terminal, the first current terminal coupled to the first diode terminal, the second current terminal coupled to the third diode terminal; a second switch having a third current terminal, the third current terminal coupled to the second diode terminal and the transformer terminal; a capacitor having a first capacitor terminal and a second capacitor terminal, the first capacitor terminal coupled to the second current terminal; and a third diode having a fourth diode terminal and a fifth diode terminal, the fourth diode terminal coupled to the first capacitor terminal, the fifth diode terminal coupled to the capacitor.

20 Claims, 8 Drawing Sheets

(56) References Cited

U.S. PATENT DOCUMENTS

| | | | | |
|---|---|---|---|---|
| 2010/0195254 A1* | 8/2010 | Cohen | ................. | H02M 1/32 |
| | | | | 361/18 |
| 2015/0214846 A1* | 7/2015 | Cohen | ............ | H02M 3/33507 |
| | | | | 363/21.18 |
| 2019/0341859 A1* | 11/2019 | Cohen | ................. | H02M 1/34 |
| 2021/0006236 A1* | 1/2021 | Liu | .................. | H03H 11/32 |

OTHER PUBLICATIONS

ST Life Augmented, "Two Switch Flyback Converter," 1 page. Downloaded Dec. 21, 2021.

\* cited by examiner

METHODS AND APPARATUS TO INCREASE AN OPERATIONAL RANGE OF A DUTY CYCLE OF A TWO-SWITCH FLYBACK CONVERTER

CROSS-REFERENCE TO RELATED APPLICATION

This patent application claims the benefit of and priority to U.S. Provisional Patent Application Ser. No. 63/136,287 filed Jan. 12, 2021, which is hereby incorporated herein by reference in its entirety.

TECHNICAL FIELD

This description relates generally to two-switch flyback converters, and more particularly to apparatus to increase the operational range of a duty cycle of a two-switch flyback converter.

BACKGROUND

Two-switch flyback converters are switch mode power supplies capable of generating a direct current (DC) output from a DC input. Two-switch flyback converters include two switches configured to supply an input voltage to a flyback transformer as a result of the switches being closed, such that an inductance of primary windings (e.g., a magnetizing inductance and a leakage inductance) of the flyback transformer charges. The two switches may be opened to clamp a voltage across the primary windings of the flyback transformer to the input voltage, such that the voltage across the primary windings of the flyback transformer is limited to the input voltage. The flyback transformer induces a current in secondary windings of the flyback transformer as a result of the switches opening.

SUMMARY

For methods and apparatus to increase an operational range of a duty cycle of a two-switch flyback converter, an example apparatus includes a first diode having a first diode terminal; a transformer having a transformer terminal; a second diode having a second diode terminal and a third diode terminal, the second diode terminal coupled to the transformer terminal; a first switch having a first current terminal and a second current terminal, the first current terminal coupled to the first diode terminal, the second current terminal coupled to the third diode terminal; a second switch having a third current terminal, the third current terminal coupled to the second diode terminal and the transformer terminal; a capacitor having a first capacitor terminal and a second capacitor terminal, the first capacitor terminal coupled to the second current terminal; and a third diode having a fourth diode terminal and a fifth diode terminal, the fourth diode terminal coupled to the first capacitor terminal, the fifth diode terminal coupled to the second capacitor terminal.

DETAILED DESCRIPTION

Figure 1:
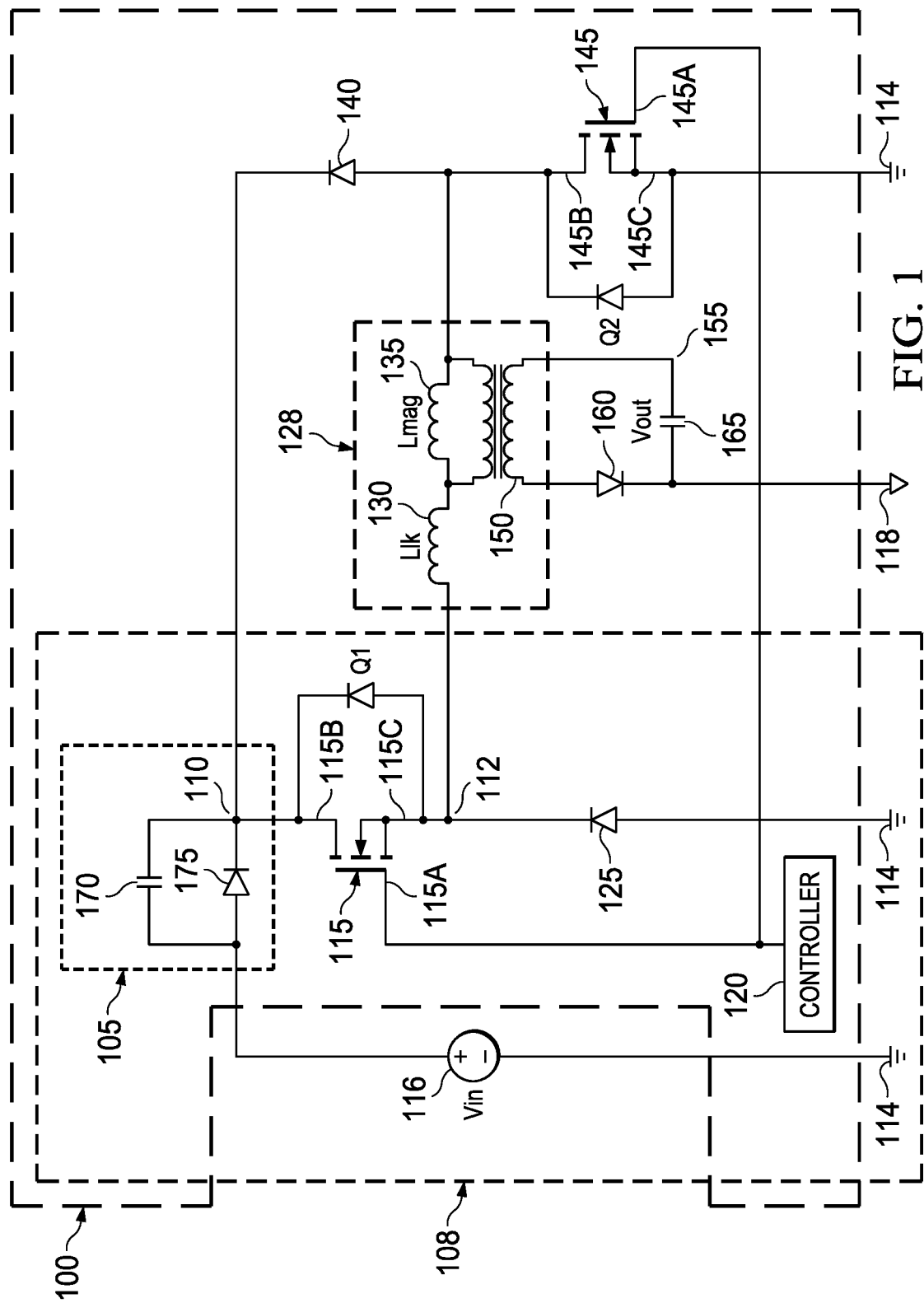
FIG. 1 is a schematic diagram of a two-switch flyback converter including a first example auxiliary circuit.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Two-switch flyback converters are switch mode power supplies capable of generating a direct current (DC) output from a DC input. Two-switch flyback converters include two switches configured to supply an input voltage to a flyback transformer (e.g., two magnetically coupled inductors) as a result of being closed, such that an inductance of a primary winding (e.g., a magnetizing inductance and a leakage inductance) between two transformer terminals of the flyback transformer charges, such that the number of windings between a first transformer terminal and a second transformer terminal determine the inductance. Two-switch flyback converters are configured to charge the inductance of the primary windings during the duration in which the switches are closed. Two-switch flyback converters are configured to allow the primary winding of the flyback transformer to discharge during the duration in which the switches are open, such that secondary windings of the flyback transformer may use the discharging primary windings to induce a current in the secondary windings during the durations of time that the switches are open. The voltage across the primary windings of the flyback transformer is clamped across the input voltage as a result of two diodes coupled in series with the primary winding of flyback transformer, such that the diodes and flyback transformer are coupled in parallel to the input voltage during the durations in which the switches are open.

The operation of conventional two-switch flyback converters is limited based on an input voltage ($V_{in}$), an on time ($T_{on}$), and an off time ($T_{off}$) as a result of the voltage across the primary windings of the flyback transformer being clamped across the input voltage. The input voltage is the voltage supplied to a flyback converter supply terminal. The on time is the duration of time that the switches are closed, such that current may flow through the switch. The off time is the duration of time that the switches are opened, such that current may not flow through the switch. The operation of conventional two-switch flyback converters is limited such that the $V_{in}$ times $T_{on}$ must be less than or equal too yin times $T_{off}$, such that the voltage being clamped to the flyback converter supply terminal, during the durations in which the switch is closed, is less than or equal to the flyback converter supply terminal. The operation of conventional two-switch flyback converters are limited based on equation (1), below. A duty cycle (D) of the operation of the conventional two-switch flyback converters may additionally be determined using Equation (2), below. The duty cycle of conventional two-switch flyback converters is limited to approximately 50 percent as a result of applying the limitation of Equation (1) to Equation (2). An output voltage ($V_{out}$) of conventional two-switch flyback converters may be determined based on $V_{in}$, $T_{on}$, $T_{off}$, and a turns ratio (N). The turns ratio is the number of windings comprising the inductance of the primary windings of the flyback transformer compared to the number of windings comprising the inductance of the secondary windings. The output voltage of conventional two-switch flyback converters may be determined using Equation (3), below. Applying the 50 percent duty cycle limitation determined by Equations (1) and (2) to Equation (3), it is determined that the $V_{out}$ is limited by the duty cycle limitation.

$$V_{in} \times T_{on} \leq V_{in} \times T_{off}, \quad \text{Equation (1)}$$

$$D = \frac{T_{on}}{T_{on} + T_{off}}, \quad \text{Equation (2)}$$

$$V_{out} = \frac{V_{in}}{N} \times \left(\frac{D}{1-D}\right), \quad \text{Equation (3)}$$

The examples described herein include example auxiliary circuitry in two-switch flyback converters to increase the range of the duty cycle configured to turn the switches on and off. The auxiliary circuitry is configured to store the energy supplied by the primary windings of the flyback transformer during the durations that the switches are open, such that the voltage across the primary windings of the flyback transformer is no longer clamped to the flyback converter supply terminal. The auxiliary circuitry may include a clamp capacitor, a rectifier, and/or a synchronous rectifier. The clamp capacitor is configured to include a capacitance which enables energy, resulting from the primary windings to be stored until the switches are closed. Additionally, the clamp capacitor may be configured to be charged to a voltage greater than the input voltage, such that the voltage across the primary windings of the flyback inductor may be greater than the voltage of the flyback converter supply terminal. A rectifier and/or a synchronous rectifier may be configured to allow the clamp capacitor to properly discharge the energy stored during the duration in which the switches were open, such that the voltage across the clamp capacitor decreases as the clamp capacitor discharges. The rectifier and/or synchronous rectifier are configured to prevent the voltage across the primary windings of the flyback transformer from clamping to the flyback converter supply terminal voltage. Advantageously, the auxiliary circuitry enables the duty cycle of the two-switch flyback converter to be greater than 50 percent as a result of the auxiliary circuitry preventing the voltage across the primary windings of the flyback transformer from being clamped to the flyback converter supply terminal voltage.

FIG. 1 is a schematic diagram of an example two-switch flyback converter 100 including a first example first auxiliary circuitry 105. In the example of FIG. 1, the two-switch flyback converter 100 includes the first auxiliary circuitry 105, example reference circuitry 108, an example first reference terminal 110, a second reference terminal 112, an example first transistor 115, an example controller 120, an example first diode 125, an example flyback transformer 128, an example first inductance 130, a second inductance 135, a second diode 140, a second transistor 145, a third inductance 150, supply output terminal 155, a third diode 160, and a first capacitor 165. In the example of FIG. 1, the two-switch flyback converter 100 is configured to generate an output voltage across the first capacitor 165 based on an input voltage from the power supply 116 of FIG. 1 and a PWM signal from the controller 120.

The power supply 116 is coupled between the first auxiliary circuitry 105 and the first common potential 114 of FIG. 1. The power supply 116 is configured to supply the input voltage to the two-switch flyback converter 100. In the example of FIG. 1, the power supply 116 is a DC voltage supply.

The first auxiliary circuitry 105 includes a second capacitor 170 and a fourth diode 175. The first auxiliary circuitry 105 is coupled between the power supply 116 and the first transistor 115. The first auxiliary circuitry 105 is configured to prevent a voltage greater than the input voltage from the power supply 116 from being clamped across the power supply 116. For example, the flyback transformer 128 may discharge a current which generates a voltage greater than the input voltage. The first auxiliary circuitry 105 is configured to store access energy released by the first inductance 130 in the second capacitor 170, such that the voltage across the second capacitor 170 may exceed the input voltage. For example, the first inductance 130 may discharge a current that may be supplied to the second capacitor 170, such that the energy released by the discharge of the first inductance 130 charges the second capacitor 170. In some such examples, the energy stored in the second capacitor 170 may be discharged into the two-switch flyback converter 100, such that the energy may charge the flyback transformer 128. Advantageously, the first auxiliary circuitry 105 prevents a voltage greater than the input voltage from being clamped across the power supply 116. Advantageously, the duty cycle of a PWM signal configured to enable and disable transistors 115 and 145 may be greater than 50 percent as a result of the second capacitor 170 being able to charge to a voltage greater than the voltage input.

The reference circuitry 108 includes the power supply 116, the first auxiliary circuitry 105, the reference terminals 110 and 112, the first transistor 115, and the first diode 125. The reference circuitry 108 is an illustrative portion of the circuitry of FIG. 1 in which a plurality of different circuitry configurations may be implemented. For example, the reference circuitry 108 may be modified to match the circuitry of FIG. 2 without changing the operation of the remaining circuitry in the two-switch flyback converter 100. The reference terminals 110 and 112 are illustrative representations of the electrical connections between the reference circuitry 108 and the remaining circuitry comprising the two-switch flyback converter 100. Alternatively, the reference circuitry 108 may be modified to be illustrate an increased or decreased portion of the circuitry of FIG. 1.

The first transistor 115 represents a first switch comprising the two-switch flyback converter 100. The first transistor 115 includes a control terminal 115A, a first current terminal 115B, and a second current terminal 115C. A drain terminal and/or a source terminal may be referred to as a current terminal. A gate terminal may be referred to as a control terminal or a control input. The control terminal 115A is coupled to the controller 120. The first current terminal 115B is coupled to the first auxiliary circuitry 105 and the second diode 140. The second current terminal 115C is coupled to the first diode 125 and the flyback transformer 128. The first transistor 115 is configured to supply current to the flyback transformer 128 as a result of being enabled by the controller 120, such that the flyback transformer 128 may charge. The first transistor 115 is configured to limit current flowing through the first transistor 115 as a result of the controller 120 disabling the first transistor 115. The first transistor 115 is a re-channel field-effect transistor (NFET). Alternatively, the first transistor 115 may be an p-channel field-effect transistor (PFET), an n-channel insulated-gate bipolar transistor (IGBT), an n-channel junction field effect transistor (JFET), an NPN bipolar junction transistor (BJT) and/or, with slight modifications, a p-type equivalent device.

The first diode 125 is coupled between the second current terminal 115C of the first transistor 115 and common potential. The first diode 125 is configured to allow current to flow from common potential towards the first transistor 115 or the flyback transformer 128 as a result of the voltage of the second current terminal 115C being approximately less than or equal to the common potential. For example, current may be supplied by the first diode 125 as a result of the flyback transformer 128 resisting the change in current immediately following the first transistor 115 being disabled.

The flyback transformer 128 includes the first inductance 130, the second inductance 135, and the third inductance 150. The flyback transformer 128 is coupled to the first transistor 115 and the first diode 125, such that current may be supplied to the flyback transformer 128 by either the first transistor 115 or the first diode 125. The flyback transformer 128 is coupled to the second diode 140 and the second transistor 145, such that current may be supplied by the flyback transformer 128 to either the second diode 140 or the second transistor 145. The flyback transformer 128 is configured to charge the flyback transformer 128 as a result of being supplied current by the first transistor 115 and by suppling current to the second transistor 145, such that the flyback transformer 128 charges when both transistors 115 and 145 are enabled. The flyback transformer 128 is configured to induce a current in the third inductance 150 as a result of the flyback transformer 128 discharging by supplying current to the second diode 140, such that the transistors 115 and 145 are disabled and current is being pulled through the first diode 125 by the flyback transformer 128. Advantageously, the flyback transformer 128 may be charged by enabling the transistors 115 and 145. Advantageously, the flyback transformer 128 may be discharged by disabling the transistors 115 and 145.

The first inductance 130 is illustrated between the second current terminal 115C of the first transistor 115 and the second inductance 135. Alternatively, the first inductance 130 may be illustrated between the second inductance 135 and the second diode 140. The first inductance 130 is configured to represent the leakage inductance of the flyback transformer 128. Alternatively, the first inductance 130 may be illustrated as part of the flyback transformer 128, such that the leakage inductance is a property of the flyback transformer 128. The first inductance 130 is configured to illustrate the portion of the inductance that supplies energy to the first auxiliary circuitry 105 during the duration where the controller 120 disables the transistors 115 and 145, such that the flyback transformer 128 is discharging. The magnitude of the first inductance 130 is useful to determine the capacitance of the second capacitor 170, such that the second capacitor 170 may store the energy released by the first inductance 130.

The second inductance 135 is coupled between the first inductance 130 and the second diode 140. Alternatively, the second inductance 135 may be illustrated between the first diode 125 and the first inductance 130. The second inductance 135 represents the inductance of the flyback transformer 128, which is magnetically coupled to the third inductance 150. The second inductance 135 is configured to charge during the durations of time in which the transistors 115 and 145 are enabled. The second inductance 135 is determined based on a number of windings (e.g., a number of conductive loops), such that the second inductance 135 may induce a current in the third inductance 150 based on a number of windings comprising the third inductance 150. In the example of FIG. 1 the second inductance 135 is magnetically coupled to the third inductance 150. Alternatively, the inductances 130, 135, and 150 may be replaced or represented as a block representation of the flyback transformer 128.

The second diode 140 is coupled between the first current terminal 115B of the first transistor 115 and the second inductance 135. The second diode 140 is configured to allow current to flow from the flyback transformer 128 to the first auxiliary circuitry 105. The second diode 140 may be configured to allow current to flow as a result of the voltage of the first current terminal 115B being less than the voltage at the flyback transformer 128.

The second transistor 145 represents a second switch comprising the two-switch flyback converter 100. The second transistor 145 includes a control terminal 145A, a first current terminal 145B, and a second current terminal 145C. The control terminal 145A is coupled to the controller 120. The first current terminal 145B is coupled to the flyback transformer 128 and the second diode 140. The second current terminal 145C is coupled to the common potential. The second transistor 145 is configured to supply current to common potential as a result of being enabled by the controller 120, such that the flyback transformer 128 may be charged as a result of the transistors 115 and 145 being enabled. The second transistor 145 is configured to limit current flowing through the second transistor 145 as a result of the controller 120 disabling the second transistor 145. The second transistor 145 is a NFET. Alternatively, the second transistor 145 may be an PFET, an n-channel IGBT, an n-channel JFET, an NPN BJT and/or, with slight modifications, a p-type equivalent device.

The third inductance 150 of the flyback transformer 128 is coupled to the third diode 160 and the first capacitor 165. The third inductance 150 is magnetically coupled to the second inductance 135. The third inductance 150 is configured to supply current to the third diode 160 and the first capacitor 165 as a result of the transistors 115 and 145 being disabled, such that the second inductance 135 of the flyback transformer 128 induces a current in the third inductance 150 as a result of the flyback transformer 128 discharging. The third inductance 150 is determined based on a number of windings (e.g., a number of conductive loops), such that the second inductance 135 may induce a current in the third inductance 150 based on a number of windings; in the inductances 135 and 150. For example, a first current may be induced in the third inductance 150 as a result of the ratio of the windings of the second inductance 135 to the windings of the third inductance 150 being greater than one. In such an example, a second current may be induced in the third inductance 150 as a result of the ratio of windings of the second inductance 135 to windings of the third inductance 150 being less than one. The inductances 130, 135, and 150 may be illustrated or replaced with a transformer configured to supply power to the third diode 160 and the first capacitor 165.

The third diode 160 is coupled between the third inductance 150 and the second common potential 118. The third diode 160 is configured to allow current to flow from the third inductance 150 to the second common potential 118. The first capacitor 165 is coupled between the third inductance 150 and the second common potential 118, such that the first capacitor 165 is coupled in series with the third inductance 150. The supply output terminal 155 is between the third inductance 150 and the first capacitor 165, such that the output voltage may be determined as the voltage across the first capacitor 165.

In the example of FIG. 1, the first auxiliary circuitry 105 includes the second capacitor 170. The second capacitor 170 is coupled between the power supply 116 and the first transistor 115, such that the first reference terminal 110 is between the second capacitor 170 and the first transistor 115. The second capacitor 170 is configured to be charged by the energy released by the first inductance 130 during the durations in time that the flyback transformer 128 is discharging. The second capacitor 170 is configured to discharge the energy stored from the first inductance 130 during the durations in time that the flyback transformer 128 is charging. For example, the second capacitor 170 may charge as a result of the controller 120 disabling the transistors 115 and 145. In such an example, the second capacitor 170 may discharge as a result of the controller 120 enabling the transistors 115 and 145. The second capacitor 170 includes a capacitance configured to prevent the voltage across the first transistor 115 from being clamped across the power supply 116 as a result of isolating the current supplied during the discharge of the flyback transformer 128 from the power supply and the using the current to charge to a voltage greater than the voltage supplied by the power supply 116.

In the example of FIG. 1, the second capacitor 170 may be a plurality of capacitances. The capacitance of the second capacitor 170 is configured to be large enough to limit a maximum peak voltage ($Vds_{max}$) across the transistors 115 and 145. The maximum peak voltage is equal to the maximum voltage across flyback transformer 128 of the flyback transformer 128. The maximum peak voltage is a maximum voltage that may be applied across the drain and source terminals of the transistors 115 and 145 and the second capacitor 170, without altering the operation of the two-switch flyback converter 100. A minimum capacitance ($Cclamp_{min}$) of the second capacitor 170 is configured based on the $Vds_{max}$, a maximum voltage ($Vin_{max}$) supplied by the power supply 116, a peak current ($Imag_{pk}$), and the leakage inductance (Llk). $Vin_{max}$ is the maximum voltage that may be supplied and/or clamped across the power supply 116, the transistors 115 and 145, and/or the second capacitor 170, without shorting the power supply 116. $Imag_{pk}$ is a maximum current flowing through the flyback transformer 128. Llk is the first inductance 130, such that Llk is equal to the leakage inductance of the flyback transformer 128. The $Cclamp_{min}$ may be determined using Equation (4) below. Advantageously, Equation (4) enables the minimum capacitance of the second capacitor 170 to be determined, such that the voltage applied across the transistors 115 and 145 is limited to reduce the energy circulating through the two-switch flyback converter 100 during the discharge of the flyback transformer 128. Advantageously, Equation (4) enables the minimum capacitance of the second capacitor 170 to be determined, such that the energy charged and discharged by the second capacitor 170 is minimized to decrease energy being circulated through the two-switch flyback converter 100. Advantageously, the duty cycle applied to the transistors 115 and 145 may be greater than 50 percent as a result of the voltage of the second capacitor 170 being configured to be greater than $Vin_{max}$.

$$Cclamp_{min} = \frac{2 \cdot Imag_{pk}^2 \cdot Llk}{Vds_{max}^2 - Vin_{max}^2}, \quad \text{Equation (4)}$$

The first auxiliary circuitry 105 includes the fourth diode 175. The fourth diode 175 is coupled between the power supply 116 and the first transistor 115, such that the first reference terminal 110 is between the fourth diode 175 and the first transistor 115. The fourth diode 175 is coupled in parallel with second capacitor 170. The fourth diode 175 is configured to allow current to flow from the power supply 116 to the first reference terminal 110. The fourth diode 175 is configured to prevent the current supplied during the discharge of the first inductance 130 from clamping a voltage across the power supply 116. The fourth diode 175 is configured to allow the current from the first inductance 130 to charge the second capacitor 170. Advantageously, the fourth diode 175 enables the energy supplied by the discharge of the flyback transformer 228 to charge the second capacitor 170, such that the energy supplied by the flyback transformer may be resupplied to the two-switch flyback converter 100 during the duration in time that the flyback transformer 128 is charging rather than to the power supply 116. Advantageously, the fourth diode 175 prevents the voltage across the flyback transformer 128 from being clamped across the power supply 116, such that the flyback transformer 128 may generate a voltage greater than the voltage supplied by the power supply 116 while discharging.

In example operation, the controller 120 enables the transistors 115 and 145 to charge the flyback transformer 128 using the power supply 116. The controller 120 disables the transistors 115 and 145 to discharge the flyback transformer 128. The first inductance 130 illustrates the leakage inductance of the flyback transformer 128. The first inductance 130 supplies a current to the two-switch flyback converter 100 as a result of the transistors 115 and 145 being disabled. The current supplied by the first inductance 130 circulates through the two-switch flyback converter 100, such that the second capacitor 170 is charged during the discharging of the flyback transformer 128. The second inductance 135 of the flyback transformer 128 is configured to illustrate a magnetizing inductance that induces a current in the third inductance 150 as a result of discharging, such that power is transferred from the second inductance 135 to the third inductance 150.

The controller 120 enables the transistors 115 and 145 to charge the flyback transformer 128. Immediately following the controller 120 enabling the transistors 115 and 145, the second capacitor 170 discharges, such that the energy that charges the second capacitor 170 charges the flyback transformer 128. The controller 120 may be configured to supply a PWM signal to enable and disable the transistors 115 and 145, such that a duty cycle of the PWM signal determines the duration that the flyback transformer 128 is charging and discharging. Advantageously, the power supplied by the two-switch flyback converter 100 may be controlled by modifying the duty cycle of the PWM signal supplied by the controller 120. Advantageously, the first auxiliary circuitry 105 prevents a voltage greater than the maximum voltage of the power supply 116 from being clamped across the power supply 116, such that the duty cycle of the PWM signal may be greater than 50 percent. Advantageously, the power supplied by the leakage inductance (illustrated as the first inductance 130) during the duration that the flyback transformer is discharging charges the flyback transformer 128. Advantageously, the first auxiliary circuitry 105 is configured to prevent the voltage across the flyback transformer 128 from clamping to the flyback converter supply terminal, such that the duty cycle of the PWM signal from the controller 120 may be increased beyond 50 percent.

Figure 2:
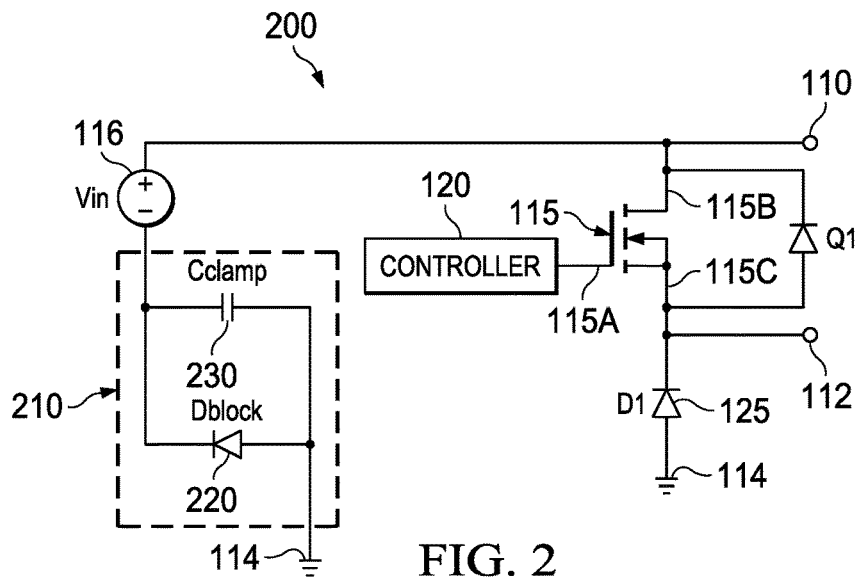
FIG. 2 is a schematic diagram of a two-switch flyback converter including a second example auxiliary circuit.

FIG. 2 is a schematic diagram 200 of the two-switch flyback converter 100 of FIG. 1 including a second example auxiliary circuit 210. In the example of FIG. 2, the schematic diagram 200 is configured to replace the reference circuitry 108 of FIG. 1, such that the reference terminals 110 and 112 of FIG. 2 correspond to the reference terminals 110 and 112 of FIG. 1. The schematic diagram 200 includes a portion of the components of the two-switch flyback converter 100 of FIG. 1 (e.g., the reference terminals 110 and 112, first transistor 115, the controller 120, and the first diode 125) configured to be coupled in a similar manner as in FIG. 1 unless otherwise stated. In the example of FIG. 2, the power supply 116 is coupled between the second auxiliary circuitry 210 and the first transistor 115, such that the first reference terminal 110 is between the power supply 116 and the first transistor 115.

In the example of FIG. 2, the second auxiliary circuitry 210 includes an example blocking diode 220 and an example clamp capacitor 230. The second auxiliary circuitry 210 is configured similar to the first auxiliary circuitry 105 of FIG. 1, such that the blocking diode 220 corresponds to the fourth diode 175 of FIG. 1 and the clamp capacitor 230 corresponds to the second capacitor 170.

The blocking diode 220 is coupled between the first common potential 114 of FIG. 1 and the power supply 116. The blocking diode 220 is configured to allow current to flow from the first common potential 114 to the power supply 116, such that the blocking diode 220 prevents current from flowing to the first common potential 114 from the power supply 116. Advantageously, the blocking diode 220 enables current supplied to the power supply 116, by the discharge of the flyback transformer 128, to charge the clamp capacitor 230.

The clamp capacitor 230 is coupled between the first common potential 114 and the power supply 116, such that the blocking diode 220 and the clamp capacitor 230 are coupled in parallel. The clamp capacitor 230 is configured to charge as a result of the controller 120 disabling the transistors 115 and 145 of FIG. 1. The clamp capacitor 230 is configured to discharge as a result of the controller 120 enabling the transistors 115 and 145, such that the energy supplied to the clamp capacitor 230 charges the flyback transformer 128. The capacitance of the clamp capacitor 230 may be determined similar to that of the second capacitor 170 of FIG. 1, such that Equation (1), above, is useful to determine the minimum capacitance.

In example operation, the controller 120 enables the transistors 115 and 145 to charge the flyback transformer 128 using the power supply 116. The controller 120 disables the transistors 115 and 145 to discharge the flyback transformer 128. The first inductance 130 supplies a current to the second auxiliary circuitry 210 as a result of the flyback transformer 128 discharging. The current supplied to the second auxiliary circuitry 210 charges the clamp capacitor 230 as a result of the blocking diode 220 preventing the current from flowing to the first common potential 114. The clamp capacitor 230 discharges as a result of the controller 120 enabling the transistors 115 and 145 to charge the flyback transformer 128. Advantageously, the second auxiliary circuitry 210 is configured to decrease the energy circulated through the two-switch flyback converter 100 as a result of the clamp capacitor 230 being sized to a minimum value based on Equation (4), above.

Figure 3:
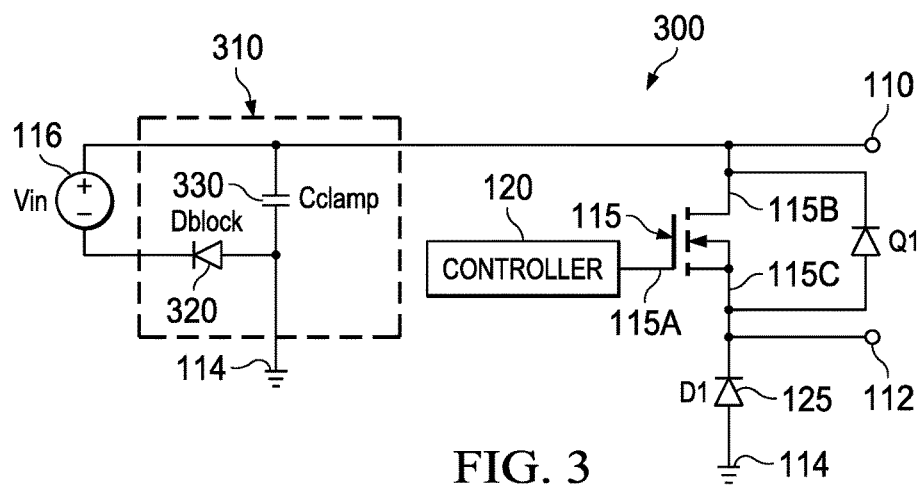
FIG. 3 is a schematic diagram of a two-switch flyback converter including a third example auxiliary circuit.

FIG. 3 is a schematic diagram 300 of the two-switch flyback converter 100 of FIG. 1 including a third example auxiliary circuit 310. In the example of FIG. 3, the schematic diagram 300 is configured to replace the reference circuitry 108 of FIG. 1, such that the reference terminals 110 and 112 of FIG. 3 correspond to the reference terminals 110 and 112 of FIG. 1. The schematic diagram 300 includes a portion of the components of the two-switch flyback converter 100 of FIG. 1 (e.g., the reference terminals 110 and 112, first transistor 115, the controller 120, and the first diode 125) configured to be coupled in a similar manner as in FIG. 1 unless otherwise stated. In the example of FIG. 3, the power supply 116 is coupled to the third auxiliary circuitry 310.

In the example of FIG. 3, the third auxiliary circuitry 310 includes an example blocking diode 320 and an example clamp capacitor 330. The third auxiliary circuitry 310 is configured similar to the first auxiliary circuitry 105 of FIG. 1, such that the blocking diode 320 corresponds to the fourth diode 175 of FIG. 1 and the clamp capacitor 330 corresponds to the second capacitor 170.

The blocking diode 320 is coupled between the first common potential 114 and the power supply 116. The blocking diode 320 is configured to allow current to flow from the first common potential 114 to the power supply 116, such that the blocking diode 320 prevents current from flowing to the first common potential 114 from the power supply 116. Advantageously, the blocking diode 320 enables current supplied to the power supply 116, by the discharge of the flyback transformer 128, to charge the clamp capacitor 330.

The clamp capacitor 330 is coupled between the first common potential 114 and the power supply 116, such that the blocking diode 320 and power supply 116 are coupled parallel to the clamp capacitor 330. The clamp capacitor 330 is configured to charge as a result of the controller 120 disabling the transistors 115 and 145 of FIG. 1. The clamp capacitor 330 is configured to discharge as a result of the controller 120 enabling the transistors 115 and 145, such that the energy supplied to the clamp capacitor 330 charges the flyback transformer 128. The capacitance of the clamp capacitor 330 may be determined similar to that of the second capacitor 170 of FIG. 1, such that Equation (1), above, is useful to determine the minimum capacitance.

In example operation, the controller 120 enables the transistors 115 and 145 to charge the flyback transformer 128 using the power supply 116. The controller 120 disables the transistors 115 and 145 to discharge the flyback transformer 128. The first inductance 130 supplies a current to the third auxiliary circuitry 310 as a result of the flyback transformer 128 discharging. The current supplied to the third auxiliary circuitry 310 charges the clamp capacitor 330 as a result of the blocking diode 320 preventing the current from flowing to the first common potential 114. The clamp capacitor 330 discharges as a result of the controller 120 enabling the transistors 115 and 145 to charge the flyback transformer 128. Advantageously, the third auxiliary circuitry 310 is configured to decrease the energy circulated through the two-switch flyback converter 100 as a result of the clamp capacitor 330 being sized to a minimum value based on Equation (4), above.

Figure 4:
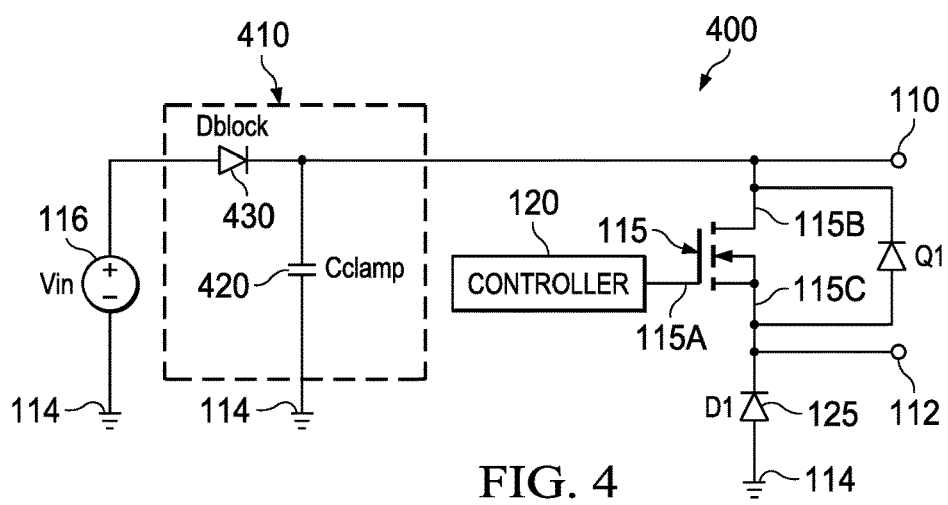
FIG. 4 is a schematic diagram of a two-switch flyback converter including a fourth example auxiliary circuit.

FIG. 4 is a schematic diagram 400 of the two-switch flyback converter 100 of FIG. 1 including a fourth example auxiliary circuit 410. In the example of FIG. 4, the schematic diagram 400 is configured to replace the reference circuitry 108 of FIG. 1, such that the reference terminals 110 and 112 of FIG. 4 correspond to the reference terminals 110 and 112 of FIG. 1. The schematic diagram 400 includes a portion of the components of the two-switch flyback converter 100 of FIG. 1 (e.g., the reference terminals 110 and 112, first transistor 115, the controller 120, and the first diode 125) configured to be coupled in a similar manner as in FIG. 1 unless otherwise stated. In the example of FIG. 4, the power supply 116 is coupled between the first common potential 114 of FIG. 1, and the fourth auxiliary circuitry 410.

In the example of FIG. 4, the fourth auxiliary circuitry 410 includes an example clamp capacitor 420 and an example blocking diode 430. The fourth auxiliary circuitry 410 is configured similar to the first auxiliary circuitry 105 of FIG. 1, such that the clamp capacitor 420 corresponds to the second capacitor 170 and the blocking diode 430 corresponds to the fourth diode 175 of FIG. 1.

The clamp capacitor 420 is coupled between the first common potential 114 and the first reference terminal 110. The clamp capacitor 420 is configured to charge as a result of the controller 120 disabling the transistors 115 and 145 of FIG. 1. The clamp capacitor 420 is configured to discharge as a result of the controller 120 enabling the transistors 115 and 145, such that the energy supplied to the clamp capacitor 420 charges the flyback transformer 128. The capacitance of the clamp capacitor 420 may be determined similar to that of the second capacitor 170 of FIG. 1, such that Equation (1), above, is useful to determine the minimum capacitance.

The blocking diode 430 is coupled between the power supply 116 and the first transistor 115, such that the power supply 116 coupled to blocking diode 430 is coupled in parallel to the clamp capacitor 420. The blocking diode 430 is configured to allow current to flow from the power supply 116 and the clamp capacitor 420 to the first transistor 115, such that the blocking diode 430 prevents current from flowing to the power supply 116 and the clamp capacitor 420 from the first reference terminal 110 and the first transistor 115.

In example operation, the controller 120 enables the transistors 115 and 145 to charge the flyback transformer 128 using the power supply 116. The controller 120 disables the transistors 115 and 145 to discharge the flyback transformer 128. The clamp capacitor 420 discharges as a result of the controller 120 enabling the transistors 115 and 145 to charge the flyback transformer 128. Advantageously, the fourth auxiliary circuitry 410 prevents a voltage greater than the value of the power supply 116 from being clamped onto the power supply 116.

Figure 5A:
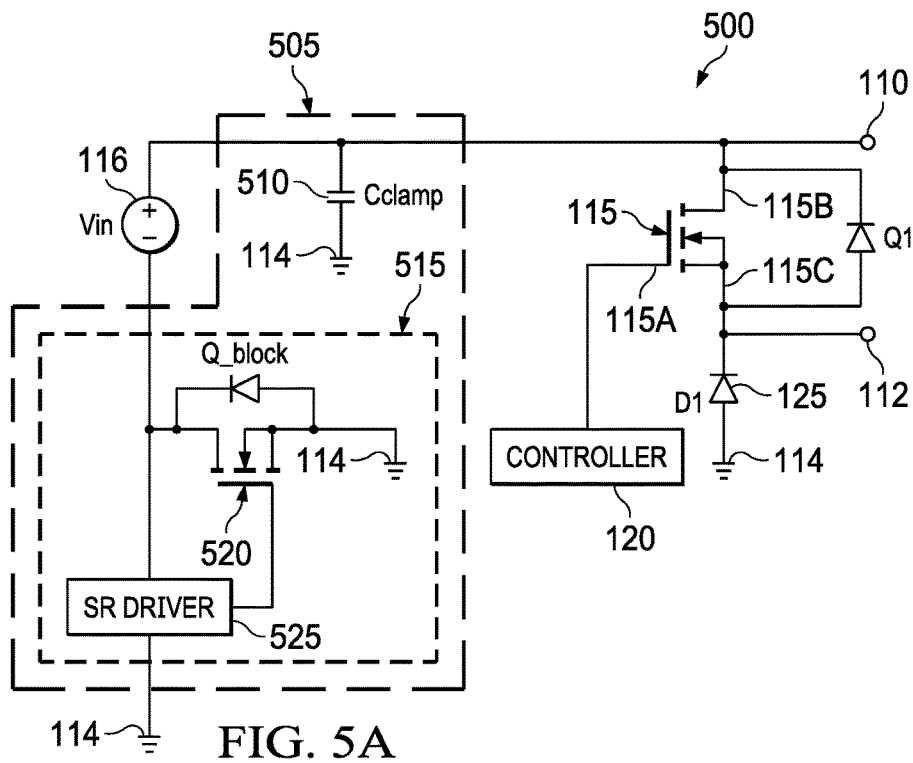
FIG. 5A is a schematic diagram of a two-switch flyback converter including a fifth example auxiliary circuit.

FIG. 5A is a schematic diagram 500 of the two-switch flyback converter 100 of FIG. 1 including a fifth example auxiliary circuit 505. In the example of FIG. 5A, the schematic diagram 500 is configured to replace the reference circuitry 108 of FIG. 1, such that the reference terminals 110 and 112 of FIG. 5A correspond to the reference terminals 110 and 112 of FIG. 1. The schematic diagram 500 includes a portion of the components of the two-switch flyback converter 100 of FIG. 1 (e.g., the reference terminals 110 and 112, first transistor 115, the controller 120, and the first diode 125) configured to be coupled in a similar manner as in FIG. 1 unless otherwise stated. In the example of FIG. 5A, the power supply 116 is coupled to the fifth auxiliary circuitry 505.

In the example of FIG. 5A, the fifth auxiliary circuitry 505 includes an example an example clamp capacitor 510 and example rectifier circuitry 515. The fifth auxiliary circuitry 505 is configured similar to the first auxiliary circuitry 105 of FIG. 1, such that the clamp capacitor 510 corresponds to the second capacitor 170 and the rectifier circuitry 515 corresponds to the fourth diode 175 of FIG. 1.

The clamp capacitor 510 is coupled between the first common potential 114 and the power supply 116. The clamp capacitor 510 is coupled to the first transistor 115, such that the first reference terminal 110 is coupled between the power supply 116 and the clamp capacitor 510. The clamp capacitor 510 is configured to charge as a result of the controller 120 disabling the transistors 115 and 145 of FIG. 1. The clamp capacitor 510 is configured to discharge as a result of the controller 120 enabling the transistors 115 and 145, such that the energy supplied to the clamp capacitor 510 charges the flyback transformer 128. The capacitance of the clamp capacitor 510 may be determined similar to that of the second capacitor 170 of FIG. 1, such that Equation (1), above, is useful to determine the minimum capacitance.

The rectifier circuitry 515 is coupled between the first common potential 114 and the power supply 116. In the example of FIG. 5A, the rectifier circuitry 515 includes an example blocking transistor 520 and an example synchronous rectifier (SR) driver 525. The rectifier circuitry 515 is configured to allow current to flow from the first common potential 114 to the power supply 116, such that the rectifier circuitry 515 prevents current from flowing to the first common potential 114 from the power supply 116. Advantageously, the rectifier circuitry 515 enables current supplied by the discharge of the flyback transformer 128, to charge the clamp capacitor 510.

The blocking transistor 520 is coupled between the first common potential 114 and the power supply 116. The blocking transistor 520 is controlled by the SR driver 525, such that a gate of the blocking transistor 520 is coupled to the SR driver 525. The blocking transistor 520 is configured to allow current to flow from the first common potential 114 to the power supply 116, such that the blocking transistor 520 limits the current flowing to the first common potential 114 from the power supply 116 during the duration of time the flyback transformer 128 is discharging. In the example of FIG. 5A, the blocking transistor 520 is a NFET. Alternatively, the blocking transistor 520 may be an PFET, an n-channel IGBT, an n-channel JFET, an NPN BJT and/or, with slight modifications, a p-type equivalent device.

The SR driver 525 is coupled to the first common potential 114, the blocking transistor 520, and the power supply 116. The SR driver 525 is configured to control the blocking transistor 520, such that current may flow from the first common potential 114 to the power supply 116 as a result of the blocking transistor 520 being enabled. The SR driver 525 may limit current flowing to the first common potential 114 to the power supply 116 as a result of the SR driver 525 disabling the blocking transistor 520. Advantageously, the SR driver 525 may disable the fifth auxiliary circuitry 505 as a result of configuring the blocking transistor 520 to allow current to flow to the first common potential 114 from the power supply 116 during the duration of time that the flyback transformer 128 is being discharged.

In example operation, the controller 120 enables the transistors 115 and 145 to charge the flyback transformer 128 using the power supply 116 and the SR driver 525 enabling the blocking transistor 520. The controller 120 disables the transistors 115 and 145 to discharge the flyback transformer 128. The SR driver 525 may configure the blocking transistor 520 to reduce current from flowing to the first common potential 114. The first inductance 130 supplies a current to the fifth auxiliary circuitry 505 as a result of the flyback transformer 128 discharging and the SR driver 525 configuring the blocking transistor 520 to prevent current from flowing to the first common potential 114. The current supplied to the fifth auxiliary circuitry 505 charges the clamp capacitor 510 as a result of the rectifier circuitry 515 preventing the current from flowing to the first common potential 114. The clamp capacitor 510 discharges as a result of the controller 120 enabling the transistors 115 and 145 to charge the flyback transformer 128. Advantageously, the fifth auxiliary circuitry 505 is configured to decrease the energy circulated through the two-switch flyback converter 100 as a result of the clamp capacitor 510 being sized to a minimum value based on Equation (4), above.

Figure 5B:
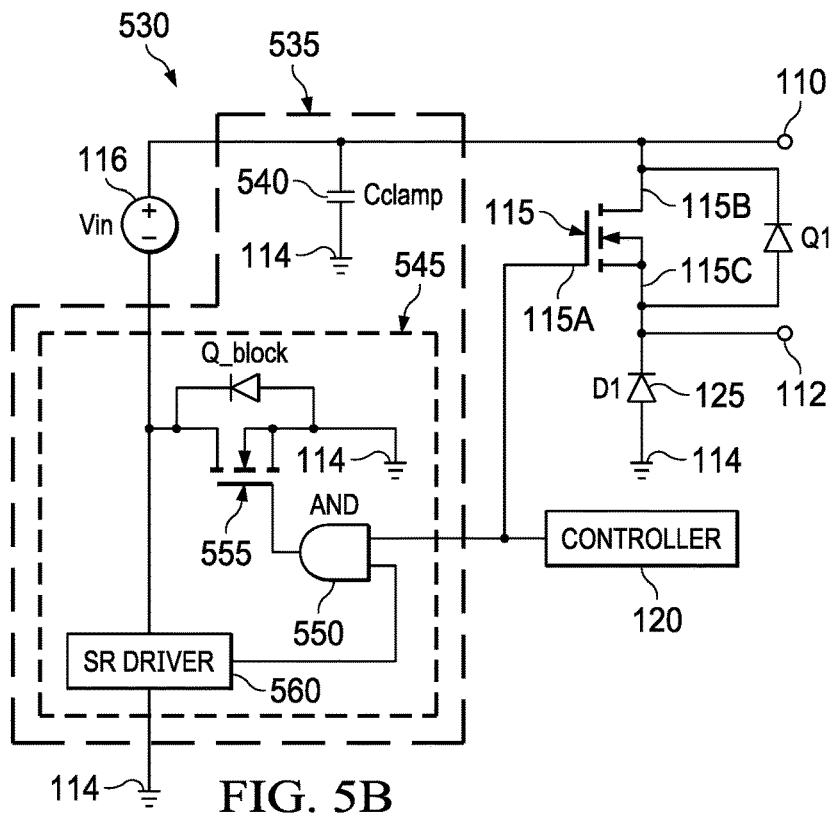
FIG. 5B is a schematic diagram of a two-switch flyback converter including a sixth example auxiliary circuit.

FIG. 5B is a schematic diagram 530 of the two-switch flyback converter 100 of FIG. 1 including a sixth example auxiliary circuit 535. In the example of FIG. 5B, the schematic diagram 530 is configured to replace the reference circuitry 108 of FIG. 1, such that the reference terminals 110 and 112 of FIG. 5B correspond to the reference terminals 110 and 112 of FIG. 1. The schematic diagram 530 includes a portion of the components of the two-switch flyback converter 100 of FIG. 1 (e.g., the reference terminals 110 and 112, first transistor 115, the controller 120, and the first diode 125) configured to be coupled in a similar manner as in FIG. 1 unless otherwise stated. In the example of FIG. 5B, the power supply 116 is coupled to the sixth auxiliary circuitry 535.

In the example of FIG. 5B, the sixth auxiliary circuitry 535 includes an example an example clamp capacitor 540 and example rectifier circuitry 545. The sixth auxiliary circuitry 535 is configured similar to the first auxiliary circuitry 105 of FIG. 1, such that the clamp capacitor 540 corresponds to the second capacitor 170 and the rectifier circuitry 545 corresponds to the fourth diode 175 of FIG. 1.

The clamp capacitor 540 is coupled between the first common potential 114 and the power supply 116. The clamp capacitor 540 is coupled to the first transistor 115, such that the first reference terminal 110 is coupled between the first transistor 115 and the clamp capacitor 540. The clamp capacitor 540 is configured to charge as a result of the controller 120 disabling the transistors 115 and 145 of FIG. 1. The clamp capacitor 540 is configured to discharge as a result of the controller 120 enabling the transistors 115 and 145, such that the energy supplied to the clamp capacitor 540 charges the flyback transformer 128. The capacitance of the clamp capacitor 540 may be determined similar to that of the second capacitor 170 of FIG. 1, such that Equation (1), above, is useful to determine the minimum capacitance.

The rectifier circuitry 545 is coupled between the first common potential 114 and the power supply 116. In the example of FIG. 5B, the rectifier circuitry 545 includes an example logic AND gate 550, an example blocking transistor 555 and an example synchronous rectifier (SR) driver 560. The rectifier circuitry 545 is configured to allow current to flow from the first common potential 114 to the power supply 116, such that the rectifier circuitry 545 prevents current from flowing to the first common potential 114 from the power supply 116. Advantageously, the rectifier circuitry 545 enables current supplied by the discharge of the flyback transformer 128, to charge the clamp capacitor 540.

The logic AND gate 550 is coupled to the controller 120, the blocking transistor 555, and the SR driver 560. The logic AND gate 550 is configured to perform a logic AND of a first AND input coupled to the controller 120 and a second AND input coupled to the SR driver 560, such that both inputs must be a logic high to set an AND output, coupled to the blocking transistor 555, to a logic high. Advantageously, the SR driver 560 may enable and disable the blocking transistor based on the controller 120 as a result of asserting the input coupled to the SR driver 560.

The blocking transistor 555 is coupled between the first common potential 114 and the power supply 116. The blocking transistor 555 is controlled by the logic AND gate 550, such that a gate of the blocking transistor 555 is coupled to the output of the logic AND gate 550. The blocking transistor 555 is configured to allow current to flow from the first common potential 114 to the power supply 116, such that the blocking transistor 555 limits the current flowing to the first common potential 114 from the power supply 116 during the duration of time the flyback transformer 128 is discharging. In the example of FIG. 5B, the blocking transistor 555 is a NFET. Alternatively, the blocking transistor 555 may be an PFET, an re-channel IGBT, an n-channel JFET, an NPN BJT and/or, with slight modifications, a p-type equivalent device.

The SR driver 560 is coupled to the first common potential 114, the power supply 116, the logic AND gate 550, and the blocking transistor 555. The SR driver 560 is configured to enable the controller 120 to control the blocking transistor 555 based on a first driver terminal, such that current may flow from the first common potential 114 to the power supply 116 as a result of the blocking transistor 555 being enabled. The SR driver 560 may prevent current flowing to the first common potential 114 from the power supply 116 as a result of the SR driver 560 disabling the blocking transistor 555 by setting the second AND input of the logic AND gate 550, coupled to the SR driver 560, to a logic low. Advantageously, the SR driver 560 may disable the sixth auxiliary circuitry 535 as a result of configuring the logic AND gate 550 to allow current to flow to the first common potential 114 from the power supply 116 during the duration of time that the flyback transformer 128 is being discharged.

In example operation, the controller 120 enables the transistors 115 and 145 to charge the flyback transformer 128 using the power supply 116 and the SR driver 560 enabling the blocking transistor 555. The controller 120 disables the transistors 115 and 145 to discharge the flyback transformer 128. The logic AND gate 550 may configure the blocking transistor 555 to prevent current from flowing to the first common potential 114. The first inductance 130 supplies a current to the sixth auxiliary circuitry 535 as a result of the flyback transformer 128 discharging and the logic AND gate 550 configuring the blocking transistor 555 to prevent current from flowing to the first common potential 114. The current supplied to the sixth auxiliary circuitry 535 charges the clamp capacitor 540 as a result of the rectifier circuitry 545 preventing the current from flowing to the first common potential 114. The clamp capacitor 540 discharges as a result of the controller 120 enabling the transistors 115 and 145 to charge the flyback transformer 128. Advantageously, the sixth auxiliary circuitry 535 is configured to decrease the energy circulated through the two-switch flyback converter 100 as a result of the clamp capacitor 540 being sized to a minimum value based on Equation (4), above.

Figure 5C:
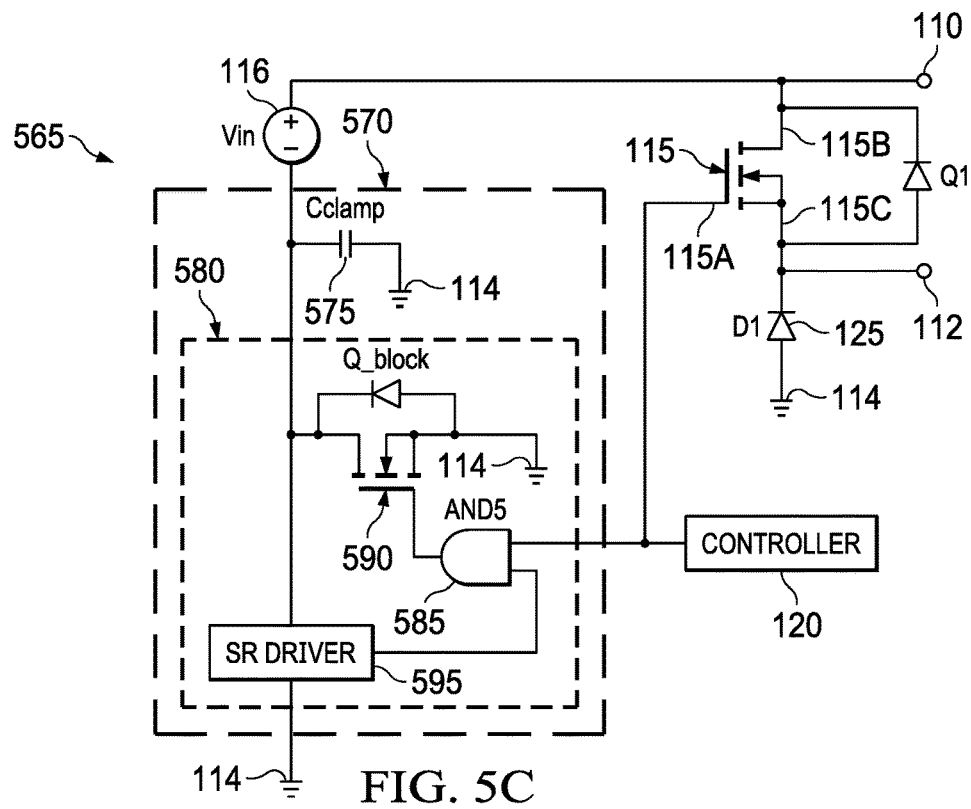
FIG. 5C is a schematic diagram of a two-switch flyback converter including a seventh auxiliary circuit.

FIG. 5C is a schematic diagram 565 of the two-switch flyback converter 100 of FIG. 1 including a seventh example auxiliary circuit 570. In the example of FIG. 5C, the schematic diagram 565 is configured to replace the reference circuitry 108 of FIG. 1, such that the reference terminals 110 and 112 of FIG. 5C correspond to the reference terminals 110 and 112 of FIG. 1. The schematic diagram 565 includes a portion of the components of the two-switch flyback converter 100 of FIG. 1 (e.g., the reference terminals 110 and 112, first transistor 115, the controller 120, and the first diode 125) configured to be coupled in a similar manner as in FIG. 1 unless otherwise stated. In the example of FIG. 5C, the power supply 116 is coupled between the first transistor 115 and the seventh auxiliary circuitry 570, such that the first reference terminal 110 is between the power supply 116 and the first transistor 115.

In the example of FIG. 5C, the seventh auxiliary circuitry 570 includes an example an example clamp capacitor 575 and example rectifier circuitry 580. The seventh auxiliary circuitry 570 is configured similar to the first auxiliary circuitry 105 of FIG. 1, such that the clamp capacitor 575 corresponds to the second capacitor 170 and the rectifier circuitry 580 corresponds to the fourth diode 175 of FIG. 1.

The clamp capacitor 575 is coupled between the first common potential 114 and the power supply 116. The clamp capacitor 575 is configured to charge as a result of the controller 120 disabling the transistors 115 and 145 of FIG. 1. The clamp capacitor 575 is configured to discharge as a result of the controller 120 enabling the transistors 115 and 145, such that the energy supplied to the clamp capacitor 575 charges the flyback transformer 128. The capacitance of the clamp capacitor 575 may be determined similar to that of the second capacitor 170 of FIG. 1, such that Equation (1), above, is useful to determine the minimum capacitance.

The rectifier circuitry 580 is coupled between the first common potential 114 and the power supply 116, such that the rectifier circuitry 580 is coupled in parallel to the clamp capacitor 575. In the example of FIG. 5C, the rectifier circuitry 580 includes an example logic AND gate 585, an example blocking transistor 590 and an example synchronous rectifier (SR) driver 595. The rectifier circuitry 580 is configured to be coupled in a similar manner as the rectifier circuitry 545 FIG. 5B, such that the logic AND gate 585 corresponds to the logic AND gate 550 of FIG. 5B, the blocking transistor 590 corresponds to the blocking transistor 555 of FIG. 5B, and the SR driver 595 corresponds to the SR driver 560 of FIG. 5B.

In example operation, the controller 120 enables the transistors 115 and 145 to charge the flyback transformer 128 using the power supply 116 and the SR driver 525 enabling the blocking transistor 590. The controller 120 disables the transistors 115 and 145 to discharge the flyback transformer 128. The logic AND gate 585 may configure the blocking transistor 590 to prevent current from flowing to the first common potential 114. The first inductance 130 supplies a current to the seventh auxiliary circuitry 570 as a result of the flyback transformer 128 discharging and the logic AND gate 585 configuring the blocking transistor 590 to prevent current from flowing to the first common potential 114. The current supplied to the seventh auxiliary circuitry 570 charges the clamp capacitor 575 as a result of the rectifier circuitry 580 preventing the current from flowing to the first common potential 114. The clamp capacitor 575 discharges as a result of the controller 120 enabling the transistors 115 and 145 to charge the flyback transformer 128. Advantageously, the seventh auxiliary circuitry 570 is configured to decrease the energy circulated through the two-switch flyback converter 100 as a result of the clamp capacitor 575 being sized to a minimum value based on Equation (4), above.

Figure 6:
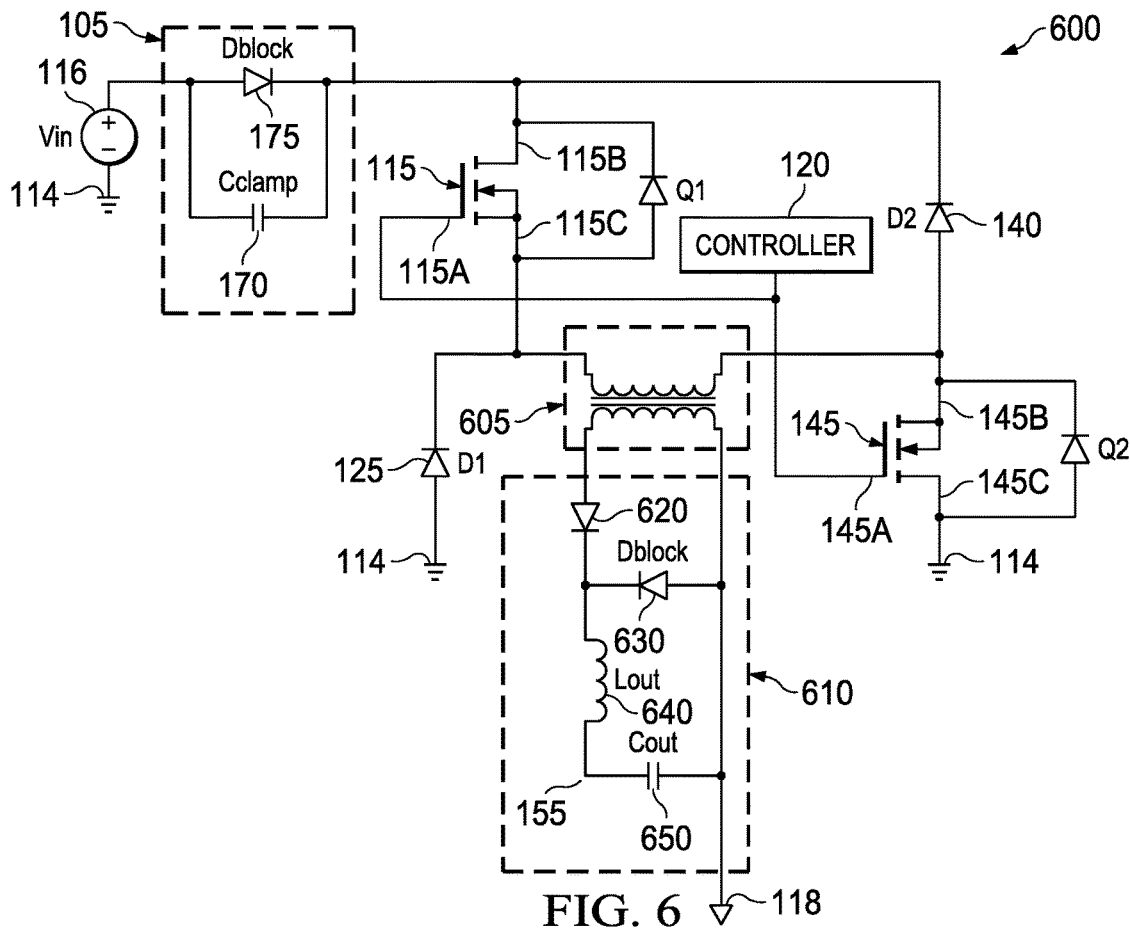
FIG. 6 is a schematic diagram of an example two-switch forward converter including the first auxiliary circuit of FIG. 1.

FIG. 6 is a schematic diagram of an example two-switch forward converter 600 including the power supply 116 of FIGS. 1-5C and the first auxiliary circuitry 105 of FIG. 1. The two-switch forward converter 600 of FIG. 6 includes the components of the two-switch flyback converter 100 of FIG. 1 (e.g., the first auxiliary circuitry 105, the transistors 115 and 145, the diodes 125 and 140, etc.) coupled in a similar manner as in FIG. 1 unless otherwise stated.

In the example of FIG. 6, the two-switch forward converter 600 additionally includes a forward transformer 605, a rectifier circuit 610, a first diode 620, a second diode 630, an inductor 640, and a capacitor 650. The rectifier circuit 610 is coupled to the forward transformer 605, such that the current induced in the forward transformer 605 is supplied to the rectifier circuit 610. The rectifier circuit 610 is configured to supply power to the supply output terminal 155. The first diode 620 is coupled between the forward transformer 605 and the second diode 630. The second diode 630 is coupled to the forward transformer 605 and the first inductor 620, such that the forward transformer 605 and the first diode 620 are coupled in parallel to the second diode 630. The inductor 640 is coupled between the second diode 630 and the capacitor 650. The capacitor 650 is coupled between the second diode 630 and the inductor 640, such that the inductor 640 and capacitor 650 are coupled in parallel to the second diode 630. The supply output terminal 155 is configured to be coupled to external circuitry such that the two-switch forward converter 600 converts a DC voltage supplied by the power supply 116 to a DC voltage supplied to the supply output terminal 155.

Figure 7:
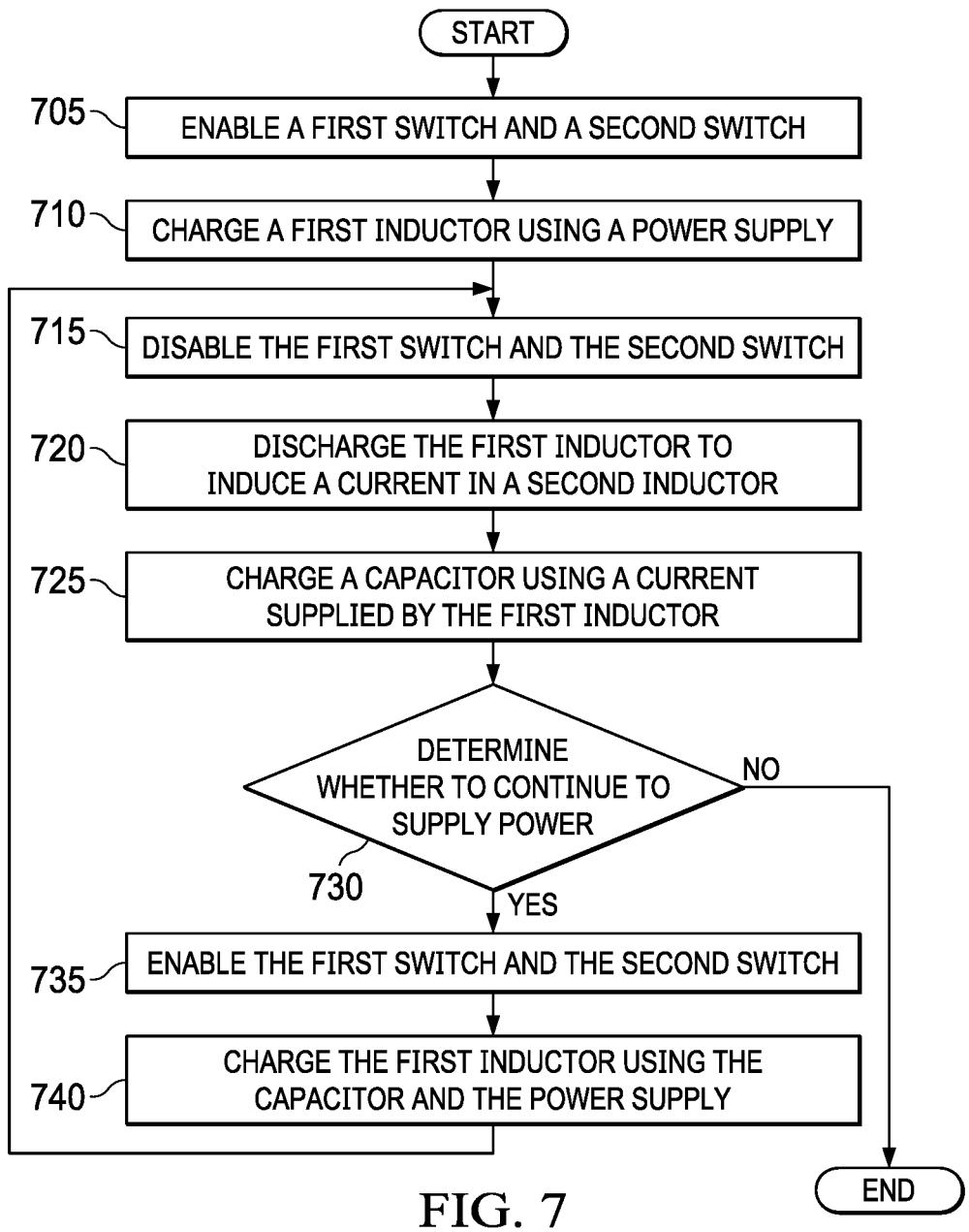
FIG. 7 is a flowchart representative of an example process that may be performed using machine readable instructions that can be executed and/or hardware configured to implement the two-switch flyback converter of FIG. 1.

FIG. 7 is a flowchart representative of an example process that may be performed using machine readable instructions that can be executed and/or hardware configured to implement the two-switch flyback converter 100 of FIGS. 1-5C. In the example of FIG. 7, the controller 120 begins at block 705 where the controller 120 enables a first switch and a second switch. For example, the controller 120 enables the first transistor 115 and the second transistor 145 by setting the control terminals 115A and 145A with a logic high portion of a PWM signal. The controller 120 enables the transistors 115 and 145 to charge the flyback transformer 128. The controller 120 proceeds to block 710.

At block 710 the controller 120 keeps the switches enabled to charge a first inductor using a power supply. For example, the controller 120 enables the transistors 115 and 145 for a duration of each cycle of the PWM signal, such that the second inductance 135 charges using power from the power supply 116. In such an example, the second inductance 135 is charged based on the duty cycle of the PWM signal supplied to the control terminals 115A and 145A. The controller 120 proceeds to block 715.

At block 715, the controller 120 disables the first switch and the second switch. For example, the controller 120 applies a logic low to the control terminals 115A and 145A to disable the transistors 115 and 145. In such an example, the logic low is applied to the control terminals 115A and 145A based on a duty cycle of the PWM signal supplied by the controller 120. The controller proceeds to block 720.

At block 720, the controller 120 allows the two-switch flyback converter 100 to discharge the first inductor and induce a current in a second inductor. For example, the controller 120 disables the transistors 115 and 145 to allow the flyback transformer 128 to discharge. In such an example, the second inductance 135 induces a current in the third inductance 150 as a result of discharging while the first inductance 130 supplies power to the first auxiliary circuitry 105. The controller 120 proceeds to block 725.

At block 725, the controller 120 allows charges a capacitor using a current supplied by the first inductor. For example, the current supplied to the first auxiliary circuitry 105 by the flyback transformer 128 discharging charges the second capacitor 170 as a result of the fourth diode 175 preventing the current from being supplied to the power supply 116. In such an example, the second capacitor 170 charges until the flyback transformer 128 is fully discharged or the controller 120 enables the transistors 115 and 145. The controller 120 proceeds to block 730.

At block 730, the controller 120 determines whether to continue to supply power. For example, the controller 120 may modify the duty cycle of the PWM signal supplied to the transistors 115 and 145 to increase or decrease the power supplied to the supply output terminal 155 of FIG. 1. The controller 120 proceeds to end the process of FIG. 7 as a result of determining to not continue to supply power to the supply output terminal 155. For example, the controller 120 sets the duty cycle of the PWM signal to zero percent. Alternatively, the controller 120 proceeds to block 735 as a result of determining to continue to supply power to the supply output terminal 155.

At block 735, the controller 120 enables the first switch and the second switch. For example, the controller 120 enables the transistors 115 and 145. In such an example, the controller 120 may enable the transistors 115 and 145 as a result of a logic high portion of the PWM signal applied to the first current terminals 115B and 145B. The controller 120 proceeds to block 740.

At block 740, the controller 120 allows the two-switch flyback converter 100 to charge the first inductor using the capacitor and the power supply. For example, the controller enables the transistors 115 and 145 to allow the second capacitor 170 to discharge, such that the second capacitor 170 supplies power to charge the flyback transformer 128. In such an example, the second capacitor 170 and the power supply 116 are configured to charge the flyback transformer 128 as a result of the transistors 115 and 145 being enabled. The controller 120 proceeds to block 715.

Although example methods are described with reference to the flowchart illustrated in FIG. 7, many other methods of charging an auxiliary circuit using a discharging inductor may alternatively be used in accordance with the in accordance with this description. For example, the order of execution of the blocks may be changed, and/or some of the blocks described may be changed, eliminated, or combined. Similarly, the manufacturing process may include additional operation before, in between, or after the blocks shown in the illustrated examples.

Figure 8:
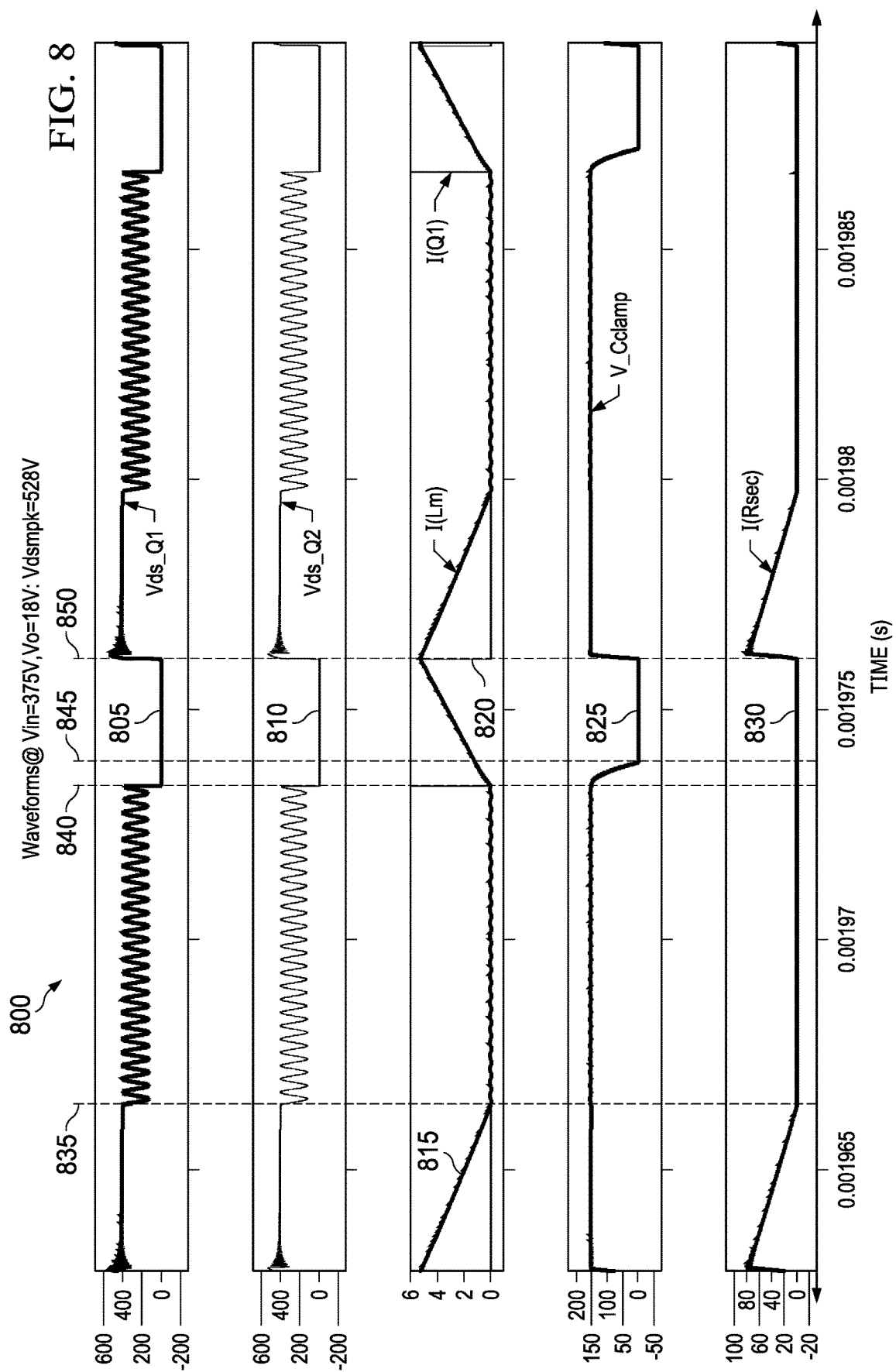
FIG. 8 is a timing diagram of a third example operation of the two-switch flyback converter of FIG. 1.

FIG. 8 is a timing diagram 800 of a third example operation of the two-switch flyback converter 100 of FIG. 1. In the example of FIG. 8, the timing diagram 800 illustrates an example first switch voltage (Vds_Q1) 805, an example second switch voltage (Vds_Q2) 810, an example inductor current (I(Lm)) 815, an example switch current (I(Q1)) 820, an example clamp voltage (V_Cclamp) 825, and an example leakage current (I(Rsec)) 830.

In the example of FIG. 8, the first switch voltage 805 represents the voltage across the current terminals 115B and 115C of the first transistor 115 of FIG. 1. The second switch voltage 810 represents the voltage across the current terminals 145B and 145C of the second transistor 145 of FIG. 1. The inductor current 815 represents the current flowing through the flyback transformer 128 of FIG. 1. The switch current 820 represents the current flowing through the first transistor 115. The clamp voltage 825 represents the voltage across the second capacitor 170 of FIG. 1. The leakage current 830 represents the current resonating through the two-switch flyback converter 100 during the discharge of the first inductance 130 (e.g., a leakage inductance).

At a first time 835, the switch voltages 805 and 810 begin to increase and decrease in a sinusoidal manner as a result of the flyback transformer 128 being approximately fully discharged, such that the switch voltages 805 and 810 are a sine wave with a DC voltage offset. At the first time 835, the inductor current 815 transitions from decreasing to approximately 0 as a result of the flyback transformer 128 being approximately fully discharged.

At a second time 840, the switch voltages 805 and 810 decrease to approximately 0 volts as a result of the controller 120 enabling the transistors 115 and 145. At the second time 840, the inductor current 815 transitions from remaining the same value to increasing as the flyback transformer 128 charge. At approximately the second time 840, the switch current 820 transitions from remaining the same value to increasing as the flyback transformer 128 charge. At the second time 840, the clamp voltage 825 transitions from remaining the same to decreasing as a result of the second capacitor 170 discharging to charge the flyback transformer 128. At a third time 845, the clamp voltage 825 transitions from decreasing to remaining the same value as a result of the second capacitor 170 being approximately fully discharged.

At a fourth time 850 the switch voltages 805 and 810 increase as a result of the transistors 115 and 145 being disabled by the controller 120. Immediately following the fourth time 850, the switch voltages 805 and 810 resonate, such that the switch voltages 805 and 810 peak at approximately the fourth time 850 before increasing and decreasing until the switch voltages 805 and 810 settles. At the fourth time 850, the inductor current 815 transitions from increasing to decreasing as a result of the flyback transformer 128 discharging. At the fourth time 850, the switch current 820 transitions to approximately 0 amps as a result of the transistor 115 being disabled. At the fourth time 850, the leakage current 830 transitions from remaining the same to increasing as a result of the first inductance 130 discharging. Immediately following the fourth time 850, the leakage current 830 begins to decrease as a result of the flyback transformer 128 discharging.

Figure 9:
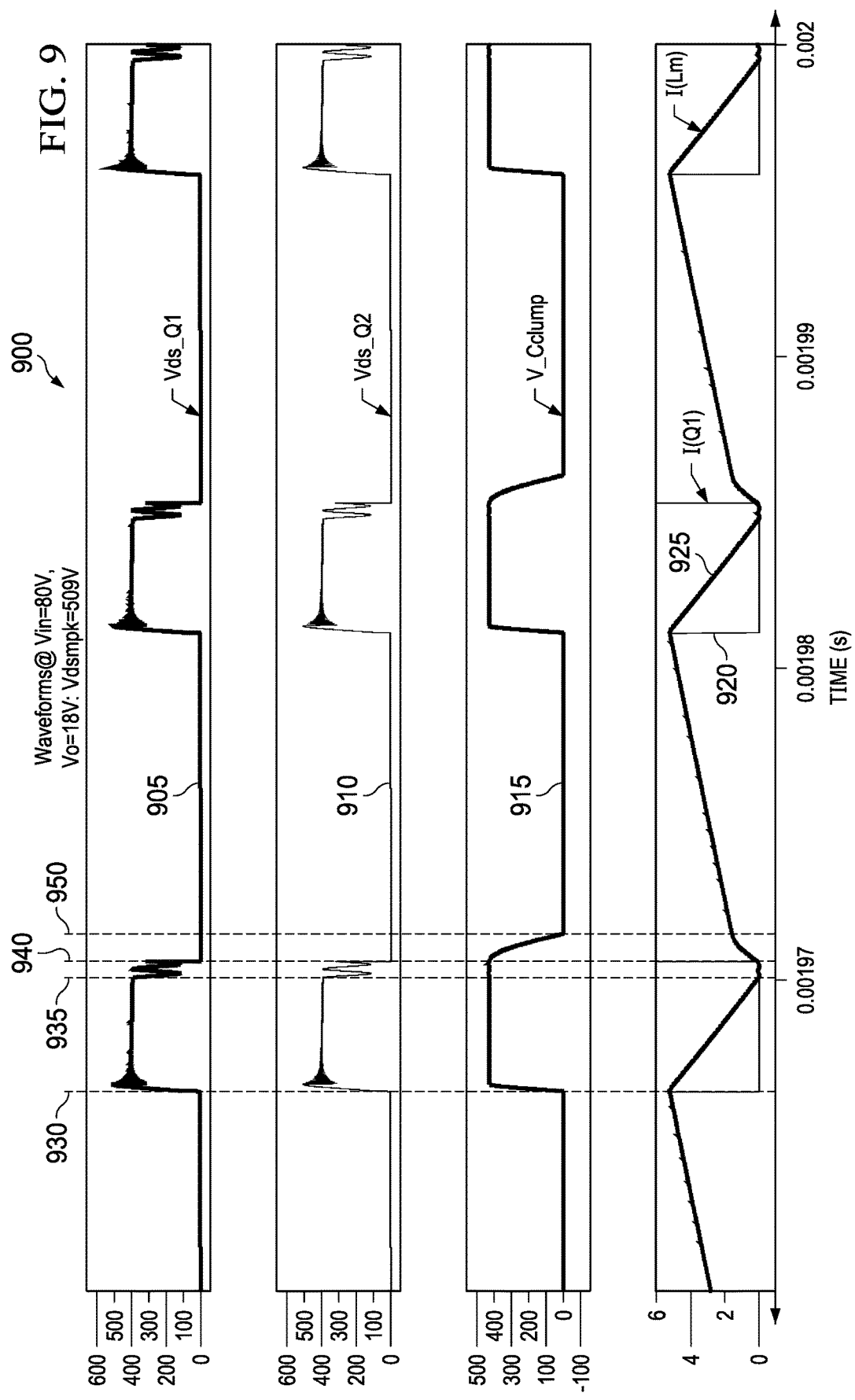
FIG. 9 is a timing diagram of a fourth example operation of the two-switch flyback converter of FIG. 1.

FIG. 9 is a timing diagram 900 of a fourth example operation of the two-switch flyback converter 100 of FIG. 1. In the example of FIG. 9, the timing diagram 900 illustrates an example first switch voltage (Vds_Q1) 905, an example second switch voltage (Vds_Q2) 910, an example clamp voltage (V_Cclamp) 915, an example switch current (I(Q1)) 920, and an example inductor current (I(Lm)) 925.

In the example of FIG. 9, the first switch voltage 905 represents the voltage across the current terminals 115B and 115C of the first transistor 115 of FIG. 1. The second switch voltage 910 represents the voltage across the current terminals 145B and 145C of the second transistor 145. The clamp voltage 915 represents the voltage across the second capacitor 170 of FIG. 1. The switch current 920 represents the current flowing through the first transistor 115. The inductor current 925 represents the current flowing through the flyback transformer 128.

At a first time 930, the switch voltages 905 and 910 transitions from approximately 0 volts to approximately 509 volts before increasing and decreasing until it settles following the first time 930 as a result of the controller 120 disabling the transistors 115 and 145. At the first time 930, the clamp voltage 915 increases as a result of the discharging flyback transformer 128 charging the second capacitor 170. At the first time 930 the switch current 920 decreases to approximately 0 amps as a result of the first transistor 115 being disabled. At the first time 930, the inductor current 925 transitions from increasing to decreasing as a result of the flyback transformer 128 transitioning from charging to discharging.

At a second time 935, the switch voltages 905 and 910 transitions from remaining the same value to increasing and decreasing to generate a sinusoidal voltage. At the second time 935, the inductor current 925 is approximately equal to 0 amps as a result of the flyback transformer 128 being approximately fully discharged.

At a third time 940, the switch voltages 905 and 910 decrease to approximately 0 volts as a result of the controller 120 enabling the transistors 115 and 145. At the third time 940, the clamp voltage 915 transitions from remaining the same value to decreasing as a result of the second capacitor 170 discharging. At the third time 940, the currents 920 and 925 begin to increase as a result of the flyback transformer 128 charging.

At a fourth time 950, the clamp voltage 915 transitions from decreasing to approximately 0 amps as a result of the second capacitor 170 being approximately fully discharged. At the fourth time 950, the currents 920 and 925 decreases the rate it increases as a result of the power supply 116 of FIGS. 1-6 charging the flyback transformer 128 without the contributions of the discharge of the second capacitor 170.

Figure 10:
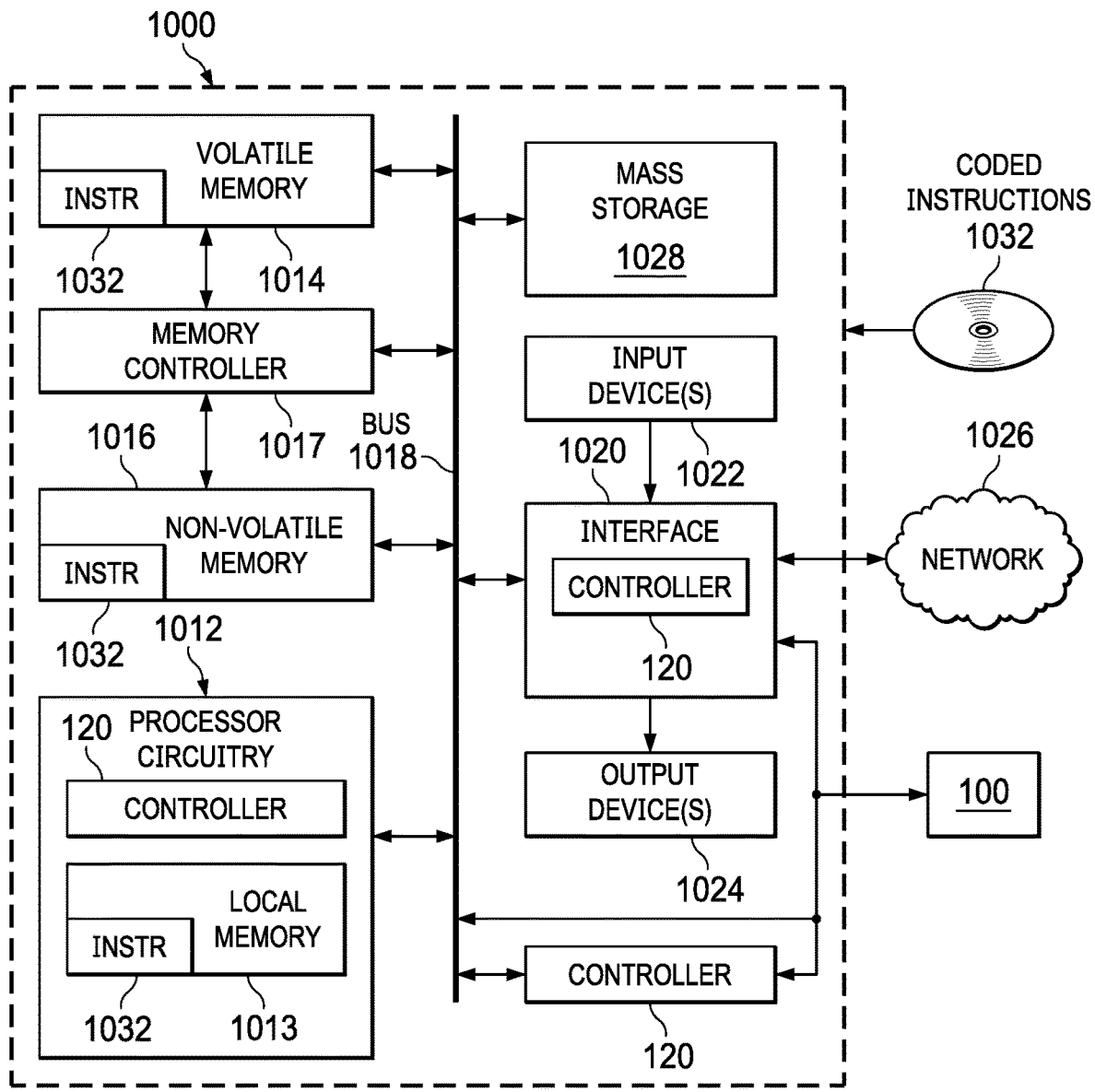
FIG. 10 is a block diagram of an example processing platform including processor circuitry structured to execute the example machine readable instructions and/or the example operations of FIG. 7 to implement the two-switch flyback converter of FIG. 1.

FIG. 10 is a block diagram of an example processing platform including processor circuitry structured to execute the example machine readable instructions and/or the example operations of FIG. 7 to implement the two-switch flyback converter of FIG. 1. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the controller 120 of FIGS. 1-6. Alternatively, the processor circuitry 1012 may be configured to implement the SR driver 525, 560, and/or 595 of FIGS. 5A-5C.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by synchronous dynamic random access memory (SDRAM), dynamic random access memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. The interface circuitry 1020 may be configured to include the controller 120 and/or the SR driver 525, 560, and/or 595. Alternatively, the controller 120 and/or the SR driver 525, 560, and/or 595 may be coupled to the bus 1018.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1032, which may be implemented by the machine readable instructions of FIG. 7, may be stored in the mass storage device 1028, in the volatile memory 1014, in the non-volatile memory 1016, and/or on a removable non-transitory computer readable storage medium such as a CD or DVD.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout this description. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

In this description, the terms "terminal", "node", "interconnection", "pin" and "lead" are used interchangeably. Unless specifically stated to the contrary, these terms generally mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While particular transistors are described herein, other transistors (or equivalent devices) may be substituted instead. For example, an NFET may be replaced by a PFET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described embodiments, and other embodiments are possible, within the scope of the claims.

What is claimed is:

1. An apparatus comprising:
   a first diode having a first diode terminal;
   a transformer having a transformer terminal;
   a second diode having a second diode terminal and a third diode terminal, the second diode terminal coupled to the transformer terminal;
   a first switch having a first current terminal and a second current terminal, the first current terminal coupled to the first diode terminal, the second current terminal coupled to the third diode terminal;
   a second switch having a third current terminal, the third current terminal coupled to the second diode terminal and the transformer terminal;
   a capacitor having a first capacitor terminal and a second capacitor terminal, the first capacitor terminal coupled to the second current terminal; and
   a third diode having a fourth diode terminal and a fifth diode terminal, the fourth diode terminal coupled to the first capacitor terminal, the fifth diode terminal coupled to the second capacitor terminal.

2. The apparatus of claim 1, wherein the capacitor is configured to limit a voltage applied to the first switch and the second switch based on an inductance of the transformer, a peak magnetizing current, and an input voltage.

3. The apparatus of claim 1, wherein the third diode is a synchronous rectifier, the synchronous rectifier coupled to a first gate terminal of the first switch.

4. The apparatus of claim 3, wherein the synchronous rectifier includes:
   an AND gate having a first AND input, a second AND input, and an AND output, the first AND input coupled to the first gate terminal;
   a transistor having a third gate terminal and a fourth current terminal, the AND output coupled to the third gate terminal; and
   a synchronous rectifier (SR) driver having a first driver terminal and a second driver terminal, the first driver terminal coupled to the fourth current terminal, and the second driver terminal coupled to the second AND input.

5. An apparatus comprising:
   a first diode having a first diode terminal;
   a transformer having a transformer terminal;
   a second diode having a second diode terminal and a third diode terminal, the second diode terminal coupled to the transformer terminal;
   a first switch having a first current terminal and a second current terminal, the first current terminal coupled to the first diode terminal, the second current terminal coupled to the third diode terminal;
   a second switch having a third current terminal, the third current terminal coupled to the second diode terminal and the transformer terminal;
   a power supply having a first supply terminal and a second supply terminal, the first supply terminal coupled to the second current terminal and the third diode terminal;
   a capacitor having a first capacitor terminal and a second capacitor terminal, the first capacitor terminal coupled to the second supply terminal; and
   a third diode having a fourth diode terminal and a fifth diode terminal, the fourth diode terminal coupled to the first capacitor terminal and the first supply terminal, the fifth diode terminal coupled to the second capacitor terminal.

6. The apparatus of claim 5, wherein the capacitor is configured to limit a voltage applied to the first switch and the second switch based on an inductance of the transformer, a peak magnetizing current, and an input voltage.

7. The apparatus of claim 5, wherein the third diode is a synchronous rectifier, the synchronous rectifier coupled to a first gate terminal of the first switch.

8. The apparatus of claim 7, wherein the synchronous rectifier includes:
an AND gate having a first AND input, a second AND input, and an AND output, the first AND input coupled to the first gate terminal;
a transistor having a third gate terminal and a fourth current terminal, the AND output coupled to the third gate terminal; and
a synchronous rectifier (SR) driver having a first driver terminal and a second driver terminal, the first driver terminal coupled to the fourth current terminal, and the second driver terminal coupled to the second AND input.

9. An apparatus comprising:
a first diode having a first diode terminal;
a transformer having a transformer terminal;
a second diode having a second diode terminal and a third diode terminal, the second diode terminal coupled to the transformer terminal;
a first switch having a first current terminal and a second current terminal, the first current terminal coupled to the first diode terminal, the second current terminal coupled to the third diode terminal;
a second switch having a third current terminal, the third current terminal coupled to the second diode terminal and the transformer terminal;
a power supply having a first supply terminal and a second supply terminal, the first supply terminal coupled to the second current terminal and the third diode terminal;
a capacitor having a first capacitor terminal and a second capacitor terminal, the first capacitor terminal coupled to the first supply terminal, the second current terminal, and the third diode terminal; and
a third diode having a fourth diode terminal and a fifth diode terminal, the fourth diode terminal coupled to the second supply terminal, the fifth diode terminal coupled to the second capacitor terminal.

10. The apparatus of claim 9, wherein the capacitor is configured to limit a voltage applied to the first switch and the second switch based on an inductance of the transformer, a peak magnetizing current, and an input voltage.

11. The apparatus of claim 9, wherein the third diode is a synchronous rectifier, the synchronous rectifier coupled to a first gate terminal of the first switch.

12. The apparatus of claim 11, wherein the synchronous rectifier includes:
an AND gate having a first AND input, a second AND input, and an AND output, the first AND input coupled to the first gate terminal;
a transistor having a third gate terminal and a fourth current terminal, the AND output coupled to the third gate terminal; and
a synchronous rectifier (SR) driver having a first driver terminal and a second driver terminal, the first driver terminal coupled to the fourth current terminal, and the second driver terminal coupled to the second AND input.

13. An apparatus comprising:
a first diode having a first diode terminal;
a transformer having a transformer terminal;
a second diode having a second diode terminal and a third diode terminal, the second diode terminal coupled to the transformer terminal;
a first switch having a first current terminal and a second current terminal, the first current terminal coupled to the first diode terminal, the second current terminal coupled to the third diode terminal;
a second switch having a third current terminal, the third current terminal coupled to the second diode terminal and the transformer terminal;
a third diode having a fourth diode terminal and a fifth diode terminal, the fourth diode terminal coupled to the second current terminal and the third diode terminal;
a power supply having a supply terminal, the supply terminal coupled to the fifth diode terminal; and
a capacitor having a capacitor terminal, the capacitor terminal coupled to the supply terminal and the fourth diode terminal.

14. The apparatus of claim 13, wherein the capacitor is configured to limit a voltage applied to the first switch and the second switch based on an inductance of the transformer, a peak magnetizing current, and an input voltage.

15. The apparatus of claim 13, wherein the third diode is a synchronous rectifier, the synchronous rectifier coupled to a first gate terminal of the first switch.

16. The apparatus of claim 15, wherein the synchronous rectifier includes:
an AND gate having a first AND input, a second AND input, and an AND output, the first AND input coupled to the first gate terminal;
a transistor having a third gate terminal and a fourth current terminal, the AND output coupled to the third gate terminal; and
a synchronous rectifier (SR) driver having a first driver terminal and a second driver terminal, the first driver terminal coupled to the fourth current terminal, and the second driver terminal coupled to the second AND input.

17. A method comprising:
enabling a first switch and a second switch;
charging a first inductor using a power supply coupled to the first inductor using the first switch;
disabling the first switch and the second switch;
discharging the first inductor to induce a current in a second inductor coupled to the first inductor, the second inductor induces a second current in a third inductor magnetically coupled to the second inductor, wherein the first inductor supplies power to a circuit coupled to the first switch, wherein the circuit includes a capacitor coupled to a diode, and wherein the diode is coupled to the power supply; and
charging the capacitor using current supplied by the first inductor.

18. The method of claim 17, further comprising determining a duty cycle of an on time and an off time of the first switch and the second switch to generate an output voltage.

19. The method of claim 18, further comprising enabling a third switch based on the duty cycle to enable a synchronous rectifier.

20. The method of claim 18, further comprising disabling a third switch based on the duty cycle to disable a synchronous rectifier.

* * * * *